United States Patent [19]
Erdman

[11] Patent Number: 5,426,776
[45] Date of Patent: Jun. 20, 1995

[54] MICROPROCESSOR WATCHDOG CIRCUIT

[75] Inventor: John L. Erdman, Eden Prairie, Minn.

[73] Assignee: Honeywell Inc., Minneapolis, Minn.

[21] Appl. No.: 159,387

[22] Filed: Nov. 30, 1993

[51] Int. Cl.⁶ ............................................. G06F 11/34
[52] U.S. Cl. .................. 395/575; 364/267.9; 364/DIG. 1
[58] Field of Search .................. 395/575; 371/61, 62, 371/16.3, 21.4, 21.1; 324/73.1, 158 R

[56] References Cited

U.S. PATENT DOCUMENTS

| | | | |
|---|---|---|---|
| 4,403,302 | 9/1983 | Young et al. | 364/900 |
| 4,586,179 | 4/1986 | Sirazi et al. | 371/12 |
| 4,759,592 | 7/1988 | Dahnert | 312/201 |
| 4,888,697 | 12/1989 | Hemminger et al. | 364/431.11 |
| 5,081,625 | 1/1992 | Rhee et al. | 371/16.3 |

OTHER PUBLICATIONS

L. Smith, "A Watchdog Circuit for μC-Based System", *Digital Design*, pp. 78–79 (Nov. 1979).

*Primary Examiner*—Robert W. Beausoliel, Jr.
*Assistant Examiner*—Phung My Chung
*Attorney, Agent, or Firm*—Charles L. Rubow

[57] ABSTRACT

A microprocessor watchdog circuit in which a voltage less than a reference voltage is supplied to a comparator substantially only in response to a pulse train status signal having a predetermined repetition rate. Repetition rate sensitivity results from a charge pump connected to receive the status pulse train through a series connected resistor and capacitor having a suitable time constant. The comparator output terminal, at which a reset signal is produced, provides a low impedance path to ground if the charge pump removes charge from a second capacitor more slowly than charge is supplied thereto through a charging resistor, thereby increasing the voltage supplied to the comparator.

11 Claims, 3 Drawing Sheets

MICROPROCESSOR WATCHDOG CIRCUIT

BACKGROUND OF THE INVENTION

The invention generally relates to circuits for monitoring and, as necessary, resetting the operation of computer apparatus, and, more particularly, to a simple microprocessor watchdog circuit for providing a reset signal in response to deviations from normal of the microprocessor status pulse train.

Watchdog timers are commonly used in association with microprocessor apparatus to monitor program execution as indicated by a status pulse train. If predetermined characteristics of the status pulse train deviate from normal, indicating improper program execution, a reset signal is provided. Watchdog timers are normally combined with other dedicated circuits to insure that when a proper operating voltage is first applied, the reset signal is provided during a power up period, and is thereafter removed for normal program execution.

A large number of techniques and circuits have been devised for performing the watchdog function. One known circuit shown in U.S. Pat. No. 5,081,625 includes an astable multivibrator circuit which provides a "low" signal to a $\overline{\text{RESET}}$ port when the multivibrator is in its first state. When power is first applied to the circuit, the miltivibrator is in its first state, and remains in that state for a predetermined initial time period sufficient to permit stabilization of microprocessor operation. Following the initial time period, the multivibrator circuit switches to a second state, thereby providing a "high" or non-reset signal to the microprocessor. An AC coupling and rectifier circuit receives a status pulse train from the microprocessor, and causes the multivibrator to remain in its second state as long as a status pulse train is present. In the event microprocessor failure results in termination of the status pulse train for a predetermined failure mode time period, the multivibrator circuit switches to its first state and provides a low or reset signal.

The above-described watchdog circuit is of simple, low cost design and provides for detection of microprocessor failures which result in discontinuance of the status pulse train. However, in certain instances, a microprocessor may fail in a mode which causes a marked increase in the status pulse train repetition rate, with attendant deviations in other characteristics of the status pulse train. Obviously, it is preferable that a watchdog circuit be capable of detecting as many failure modes of the microprocessor as possible.

Various watchdog circuit designs employing comparators for supplying signals to microprocessor reset ports are also known. One example for a microprocessor requiring a "high" signal for reset, and having a passive status output port is described on pages 78 and 79 of the November 1979 issue of "Digital Design". In that circuit design, the inverting input terminal of the comparator is impressed with a voltage developed across a capacitor in response to electric current from a supply circuit, feedback through a resistor from the comparator output terminal, and a pulse train responsive circuit connected to the status output port. As shown, the supply circuit includes a Zener diode connected in series with the capacitor between an unregulated voltage source and ground, and a relatively low resistance resistor connected across the capacitor.

In such a circuit, the voltage across the capacitor will vary with variations in the voltage from the unregulated source, which apparently will result in variations of the comparator switching point. Also, the current through the resistor connected across the capacitor and the power dissipated thereby apparently will become undesirably large with any significant increase in the voltage from the unregulated source.

The applicant has avoided the foregoing disadvantages by providing a simple, low cost watchdog circuit which is sensitive to both increases and decreases of the status pulse train repetition rate from its normal value, and whose operation is unaffected by normal variations in an unregulated supply voltage.

SUMMARY OF THE INVENTION

The invention is a watchdog circuit in which the reset signal for a microprocessor is produced by a voltage comparator which receives a first input voltage from a reference circuit and a second input voltage from a pulse train responsive circuit including a first resistor and a first capacitor connected in series to the microprocessor status output port. The second input voltage comprises the voltage across a second capacitor which is charged at a limited rate through a charging resistor and discharged at a rate which depends on the repetition rate of the microprocessor status pulse train.

The pulse train repetition rate is converted to a discharging current by a charge pump including first and second diodes individually connected at a node to the series connected resistor and capacitor, the diodes respectively being oriented to permit current flow in opposite directions through the series connected resistor and capacitor. The first diode is connected to a first plate of the second capacitor, and the second diode is connected to a current sink at a higher voltage than the voltage on the first plate of the second capacitor.

A feedback resistor may be provided around the voltage comparator to modify the first input voltage so as to introduce switching hysteresis. A third diode may be connected between the first plate of the second capacitor and the output terminal of the voltage comparator to discharge the second capacitor when the comparator is in one of its two switched states.

DESCRIPTION OF THE PREFERRED EMBODIMENT

Figure 1:
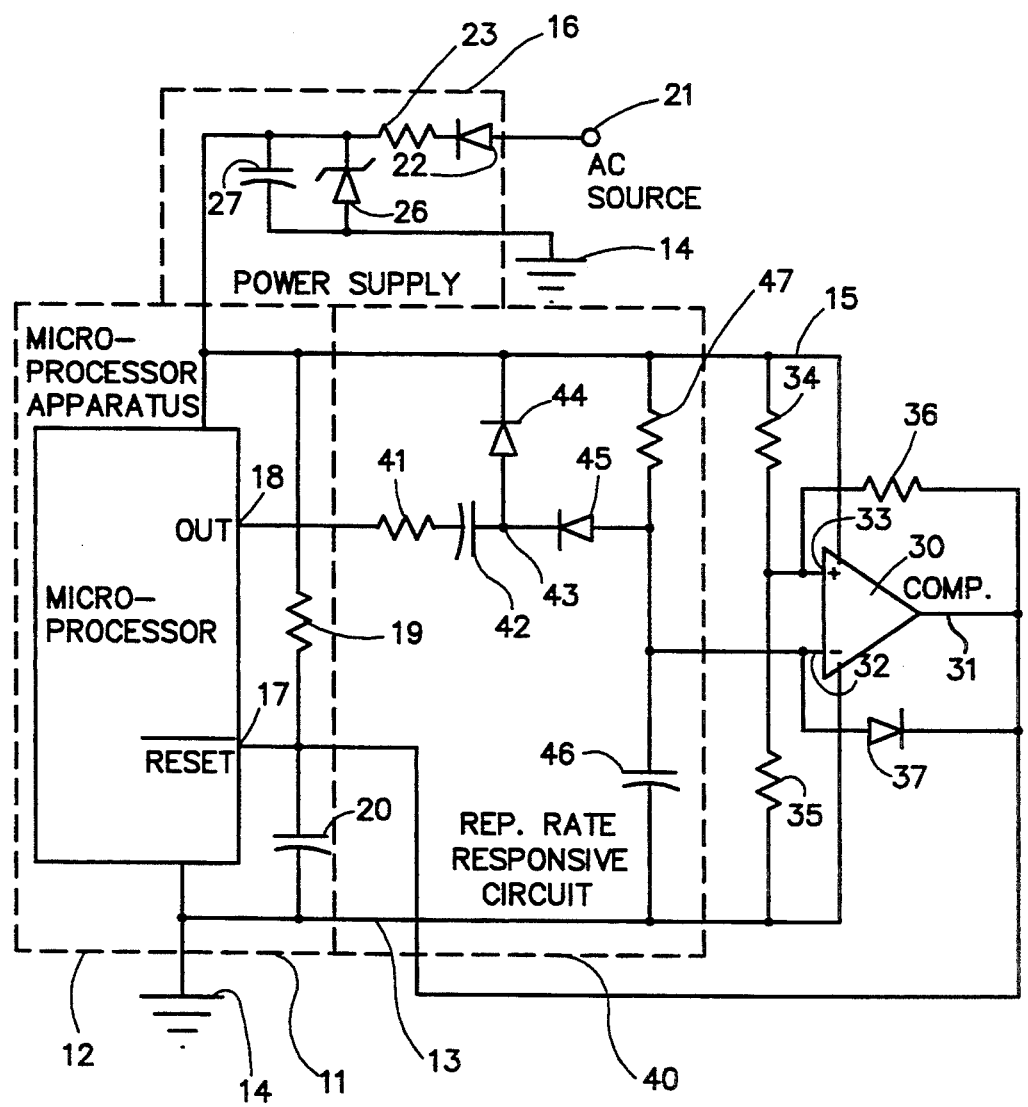
FIG. 1 is a schematic diagram of the applicant's watchdog circuit in combination with a block diagram of a microprocessor and its attendant power supply.

In the circuit diagram of FIG. 1, reference number 11 identifies microprocessor apparatus including a microprocessor 12 having a pair of power supply terminals, one of which is connected to a first supply conductor 13 maintained at system reference potential or ground, as shown at 14. The other power supply terminal of microprocessor 12 is connected to a second supply conductor 15 maintained at a voltage different from ground 14 by a power supply circuit identified by reference numeral 16. Microprocessor 12 also has a reset port 17 which must be maintained at a voltage greater than a predetermined reset voltage for normal program execution, and a status output port 18 at which a pulse train having a predetermined repetition rate, pulse voltage and duty cycle is produced only when the microprocessor is properly executing a program.

Microprocessor apparatus 11 also includes a dedicated circuit for biasing reset port 17 to a voltage above the reset voltage, the dedicated circuit including a resistor 19 and a capacitor 20 connected in series between supply conductors 13 and 15, the junction between resistor 19 and capacitor 20 being connected to reset port 17.

Power supply circuit 16 includes a pair of supply input terminals respectively connected to ground 14 and an AC voltage source 21, which may, for example, supply 24 volts AC. Power supply circuit 16 is schematically shown as comprising a diode 22 and a resistor 23 connected in series between AC voltage source 21 and supply conductor 15. Diode 22 provides for half wave rectification of the AC input voltage, and resistor 23 provides for current limiting through a voltage regulator comprising a Zener diode 26. Zener diode 26 limits the voltage on supply conductor 15 to a predetermined value of, for example, 5 volts DC. A capacitor 27 connected in parallel with Zener diode 26 provides a voltage smoothing and energy storage function which is significant in the operation of the applicant's watchdog circuit, as will be described hereinafter.

Reset terminal 17 of microprocessor 12 is connected to a voltage comparator 30 through its output terminal 31, comparator 30 also having inverting and noninverting input terminals 32 and 33. Comparator 30 has open collector output stage which causes output terminal 31 either to have a high impedance or to offer a low impedance to ground, depending on the relative magnitudes of the voltages supplied to input terminals 32 and 33. More particularly, during proper program execution by microprocessor 12, the input voltages to comparator 30 are such that the output terminal thereof has a high impedance. This allows reset port 17 to remain at the voltage across capacitor 20 in the reset biasing circuit. However, when microprocessor 12 is not properly executing a program, the voltages at input terminals 32 and 33 of comparator 30 are such that output terminal 31 thereof offers a low impedance electrical path to ground, thus reducing the voltage at reset port 17 to a voltage which resets the operation of the microprocessor.

As shown in FIG. 1, noninverting input terminal 33 of comparator 30 is connected to the junction between a pair of resistors 34 and 35 connected in series between supply conductors 13 and 15, resistors 34 and 35 functioning as a voltage divider. Thus, noninverting input terminal 33 is normally maintained at a predetermined reference voltage having a magnitude between ground and the DC voltage on supply conductor 15, as determined by the relative impedances of resistors 34 and 35.

A feedback resistor 36 is shown connected between output terminal 31 and noninverting input terminal 33 of comparator 30. Feedback resistor 36 functions to provide switching hysteresis to assure unambiguous switching as the input voltages to comparator 30 change relative to one another. A diode 37 is shown connected between output terminal 31 and inverting input terminal 32 to discharge a capacitor across which is developed the input voltage to terminal 32, as will be described hereinafter.

The voltage at inverting input terminal 32 of comparator 30 is established by a repetition rate or pulse train responsive circuit identified by reference numeral 40 connected between status output port 18 of microprocessor 12 and the noninverting input terminal. Circuit 40 includes a resistor 41 and a capacitor 42 connected in series between output port 18 and a node 43 between a pair of diodes 44 and 45 oriented or poled to allow current flow in opposite directions through the resistor and capacitor.

More specifically, diode 44 is connected between node 43 and supply conductor 15. Diode 45 is connected between node 43 and inverting input terminal 32 of comparator 30, input terminal 32 also being connected to supply conductor 13 through a capacitor 46. Capacitor 46 is normally charged at a limited rate through a resistor 47 which serves as a charging means connected between the capacitor and power supply conductor 15. Capacitor 46 is also discharged through action of a charge pump circuit including resistor 41, capacitor 42 and diodes 44 and 45 in response to characteristics of the status pulse train produced at status output port 18 of microprocessor 12. Operation of the charge pump circuit can be visualized by assuming a steady state condition in which there has been no output pulse train from port 18 for some time. In that event, the voltage across capacitor 46 will be equal to the voltage on supply conductor 15, and junction 43 will be nominally at the same voltage.

Now, assuming initiation of pulse train signal from port 18, at the rising edge of the first pulse, capacitor 42 attempts to raise the voltage at node 43, thereby forward biasing diode 44, and transferring sufficient charge from capacitor 42 to capacitor 27 in power supply 16 to maintain junction 43 at one diode voltage drop below the voltage on supply conductor 15. At the subsequent falling edge of a pulse in the status pulse train, capacitor 42 attempts to lower the voltage at node 43, which forward biases diode 45 and causes transfer of sufficient charge from capacitor 46 to capacitor 42 to maintain junction 43 at one diode voltage drop below the voltage across capacitor 46. At the rising edge of the next pulse in the status pulse train, this charge is transferred through diode 44 to capacitor 27. Thus, charge which is supplied to capacitor 46 through resistor 47 is pumped from capacitor 46 to capacitor 27 through diodes 44 and 45.

Figure 2:
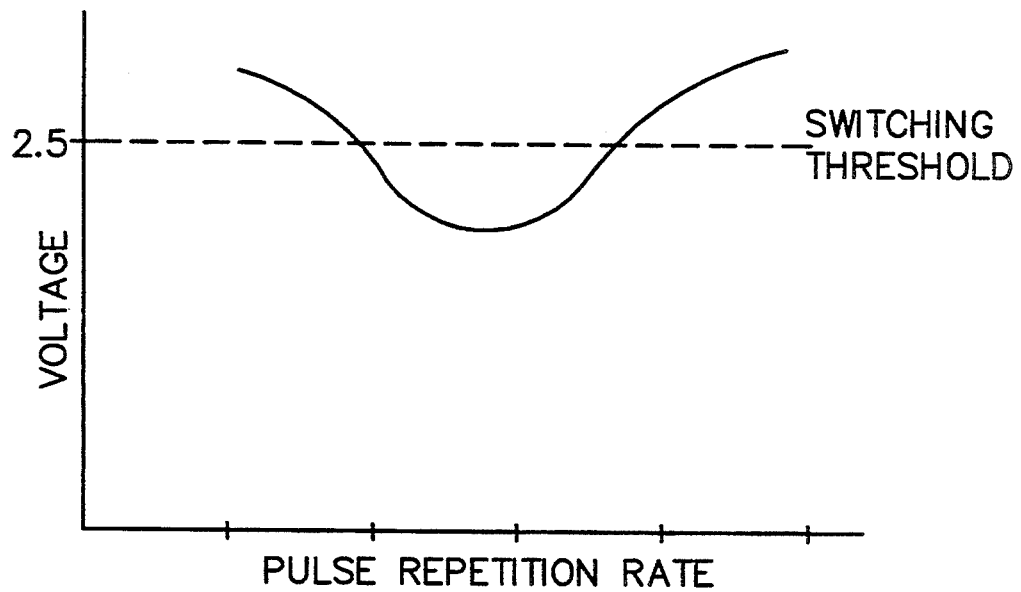
FIG. 2 is a curve showing the repetition rate response of a pulse train responsive circuit in the watchdog circuit of FIG. 1.

The rate at which charge is supplied to and pumped from capacitor 46 determines the voltage across the capacitor and at inverting input terminal 32 of comparator 30. The rate at which charge is pumped from capacitor 46 is determined by the repetition rate and other characteristics of the status pulse train at status output port 18 and the values of resistor 41 and capacitor 42. More specifically, resistor 41 and capacitor 42 have a predetermined time constant which provides for maximum charge transfer at the repetition rate of the status pulse train when microprocessor 12 is properly executing a program. Thus, the repetition rate response of this circuit is as shown in FIG. 2, from which it is apparent that deviation of the repetition rate in either direction from its normal operating value decreases the charge transfer from capacitor 46 and increases the voltage at inverting input terminal 32.

Figure 3:
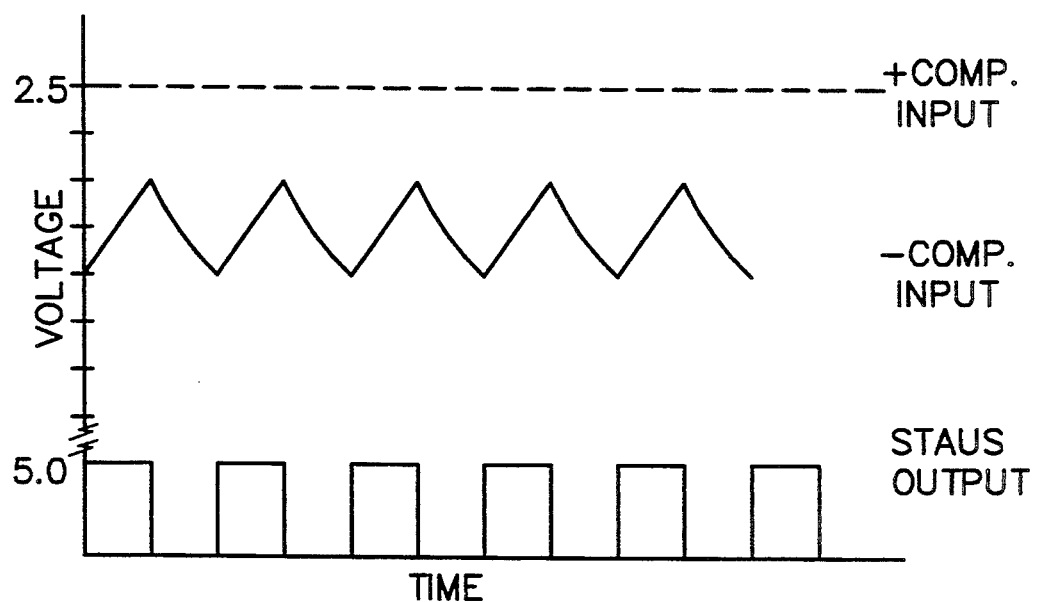
FIG. 3 illustrates the input voltages to a comparator in the circuit of FIG. 1 with a normal status pulse train from the microprocessor.

FIG. 3 illustrates the input voltage waveforms to comparator 30 during normal operation of microprocessor 12. As can be seen, the voltage at inverting input terminal 32, as developed across capacitor 46, increases and decreases in synchronism with the pulse train output at status port 18. However, there is no overall incline of the waveform, and the voltage never reaches the reference voltage supplied to noninverting input terminal 33. Thus, comparator 30 continues to exhibit a high impedance output, and no reset signal is supplied to microprocessor 12.

Figure 4:
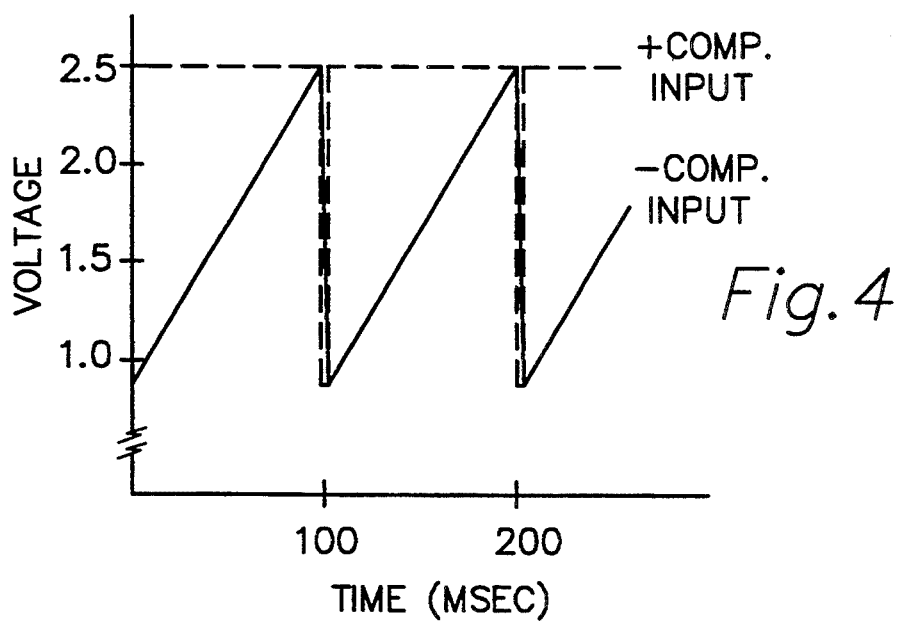
FIG. 4 illustrates the input voltage waveforms to the comparator when no status pulse train is being received from the microprocessor.

The band pass characteristic of circuit 40 can be further visualized by considering that resistor 41 limits the flow of current through node 43 at frequencies higher than a normal operating repetition rate, and capacitor 42 limits the flow of current through the node at frequencies below the normal operating repetition rate. At one extreme is the situation in which the signal produced at output port 18, rather than being a pulse train, is a DC signal at either the voltage on supply conductor 13 or the voltage on supply conductor 15. In that event a steady state voltage is developed across capacitor 42, and no further charge is pumped from capacitor 46. FIG. 4 illustrates the input voltage waveforms to comparator 30 in that situation. Specifically, the voltage across capacitor 46 and at inverting input terminal 32 increases until it reaches the reference voltage at noninverting input terminal 33. Output terminal 31 then furnishes a low impedance path to ground, capacitor 46 is discharged through diode 37, and the reference voltage at noninverting 33 is decreased by means of feedback resistor 36. Comparator 30 then switches back to present a high impedance at output terminal 31, the reference voltage at noninverting input terminal 33 steps back to its previous value, and the voltage at inverting input terminal begins to increase. This cycle continues until a pulse train is produced at output port 18, or power to the system is shut off.

Figure 5:
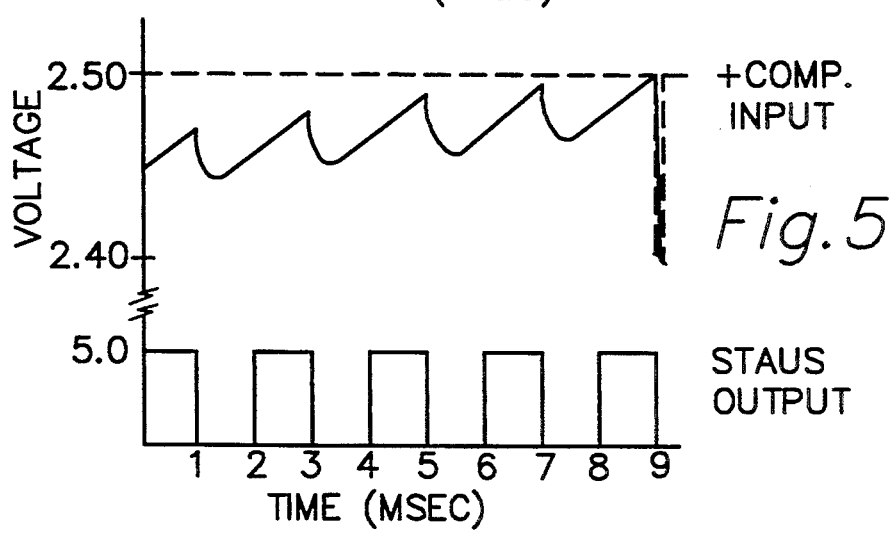
FIG. 5 illustrates the input voltage waveforms to the comparator when the status pulse train as a repetition rate less than a minimum cut off repetition rate.

If the status pulse train has a repetition rate below the minimum cut off repetition rate, as illustrated in FIG. 5, the charge pump circuit is able to remove some charge from capacitor 46 at the trailing each of each status pulse. However, charge is not removed at as great a rate as that at which it is supplied. Accordingly, the voltage at inverting input terminal 32 gradually increases until comparator 30 switches states.

Figure 6:
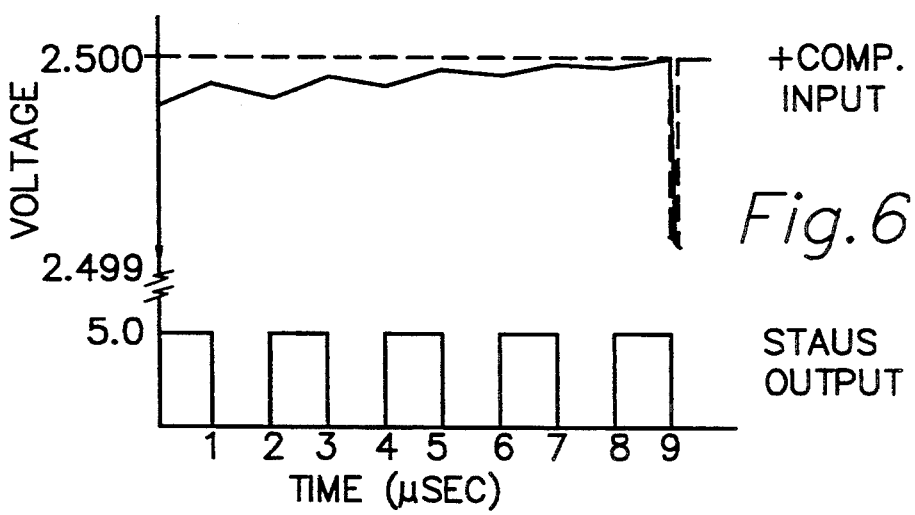
FIG. 6 illustrates the input voltage waveforms to the comparator when the status pulse train has a repetition rate above the maximum cut off repetition rate.

Similarly, if the status pulse train has a repetition rate above the maximum cut off repetition rate, as illustrated in FIG. 6, insufficient voltage is built up across capacitor 42 during the status pulses to permit the charge pump to maintain the voltage at inverting input terminal 32 below the reference voltage. In this situation comparator 30 also periodically switches state and resets microprocessor 12.

Accordingly, the applicant has provided a simple, low cost watchdog circuit capable of monitoring all microprocessor failure modes which result in a deviation of the microprocessor operating status pulse train repetition rate, whether those deviations are reflected in reductions or increases in the repetition rate. Although a particular embodiment has been shown and described for illustrative purposes, a variety of variations and modifications which do not depart from the applicant's contemplation and teaching will be apparent to those of ordinary skill in the relevant arts. It is not intended that coverage be limited to the embodiment shown, but only by the terms of the following claims.

The embodiments of the invention in which an exclusive property or right is claimed are defined as follows:

1. A watchdog circuit for a microprocessor having a status output port at which is produced a pulse train signal having a predetermined repetition rate only when properly executing a program, and having a reset port at which a reset voltage of less than predetermined value is required to reset microprocessor operation, the watchdog circuit comprising:

voltage comparator means having noninverting and inverting input terminals and an output terminal at which is produced a voltage of greater than or less than the predetermined value if a voltage supplied to the inverting input terminal is respectively less than or greater than a voltage supplied to the noninverting input terminal;

reference means connected to the noninverting input terminal of said voltage comparator means, and operable to supply a reference voltage thereto;

a pulse train responsive circuit having an input terminal for receiving a microprocessor status pulse train and an output terminal at which is produced a voltage less than the reference voltage only when the microprocessor status pulse train received at the input terminal thereof has substantially the predetermined repetition rate, said pulse train responsive circuit including a first resistor and a first capacitor connected in series and means connecting the series connected first resistor and first capacitor between the input and output terminals of said pulse train responsive circuit;

means for connecting the input and output terminals of said pulse train responsive circuit to the status output port of the microprocessor and the inverting input terminal of said voltage comparator means respectively; and means for connecting the output terminal of said voltage comparator means to the reset port of the microprocessor.

2. The watchdog circuit of claim 1 wherein:

the first resistor and the first capacitor are connected in series between the input terminal of said pulse train responsive circuit and a first node therein;

a first diode is connected between the first node and an electric current sink, the first diode being poled to permit current flow only in a first direction between said first capacitor and the first node; and a second diode and a second capacitor are connected in series between an electric current source and the first node, said second diode being poled to generally permit current flow only in a second direction between said first capacitor and the first node, the junction between said second diode and said second capacitor being connected to the inverting input terminal of said voltage comparator means.

3. The watchdog circuit of claim 2 further including a third diode connected between the inverting input terminal of said voltage comparator means and the output terminal thereof, said third diode being poled to discharge said second capacitor and decrease the voltage at the inverting input terminal when said voltage comparator means is operating to produce a voltage of less than the predetermined value at the output terminal thereof.

4. The watchdog circuit of claim 3 further including charging means connected to and operable to provide current to the junction between said second diode and said second capacitor sufficient to gradually increase the voltage across said second capacitor.

5. The watchdog circuit of claim 4 wherein said reference means comprises a resistive voltage divider connected between the current source and the current sink.

6. The watchdog circuit of claim 5 further including a second resistor connected between the output terminal of said voltage comparator means and the noninverting input terminal thereof.

7. A watchdog circuit for microprocessor apparatus including a microprocessor having first and second power supply terminals, a reset terminal to which a predetermined voltage must be supplied for normal the microprocessor operation, and a status output terminal at which is produced a bi-level voltage pulse train characterized by a predetermined repetition rate only when a program is being properly executed by the microprocessor, the microprocessor apparatus further including biasing means for biasing the reset terminal to the predetermined voltage, said watchdog circuit comprising:

first and second power supply conductors to be maintained at a system reference voltage and a voltage different from the system reference voltage respectively for supplying electric current to a load connected therebetween;

means for connecting the first and second power supply terminals of the microprocessor to said first and second power supply conductors respectively;

comparator means connected to said first and second power supply conductors, said comparator means having first and second input terminals, and having an output terminal for connection to the reset terminal of the microprocessor, said comparator means adapted to cause the output terminal thereof to appear as an open circuit when the voltage at the second input terminal thereof is less than the voltage at the first input terminal thereof, and to cause the output terminal thereof to provide low impedance to said first power supply conductor when the voltage at the second input terminal thereof is greater than the voltage at the first input terminal thereof;

reference means connected to supply a reference voltage to one of the first and second input terminals of said comparators means; and a pulse train responsive circuit having an input terminal to be connected to the status output terminal of the microprocessor and an output terminal connected to the other of the first and second input terminals of said comparator means, said pulse train responsive circuit including a first capacitor connected between the output terminal thereof and one of said first and second power supply conductors, said pulse train responsive circuit further including a first resistor and a second capacitor connected in series between the input terminal thereof and a node therein, a first diode connected between the node and the output terminal thereof, and a second diode connected between said node and the other of said first and second power supply conductors, the first and second diodes being oriented to permit current flow in opposite directions through the series connected first resistor and second capacitor.

8. The watchdog circuit of claim 7 further including a third diode connected between said other of the first and second input terminals of said comparator means and the output terminal thereof, said third diode being oriented to discharge the first capacitor when said comparator means is operating to provide a low impedance path to said first power supply conductor through the output terminal thereof.

9. The watchdog circuit of claim 8 further including charging means connected to the output terminal of said pulse train responsive circuit for providing current thereto sufficient to increase a charge on said first capacitor at a predetermined rate.

10. The watchdog circuit of claim 9 wherein said reference means comprises a resistive voltage divider connected between said first and second power supply conductors.

11. The watchdog circuit of claim 10 further including a second resistor connected between the output terminal of said comparator means and the input terminal thereof to which said reference means is connected.

* * * * *